United States Patent [19]
Lawrence et al.

[11] Patent Number: 5,918,533
[45] Date of Patent: Jul. 6, 1999

[54] TORTILLA MANUFACTURING APPARATUS

[75] Inventors: John C. Lawrence; Mark Lawrence; Eric C. Lawrence, all of South El Monte, Calif.

[73] Assignee: Lawrence Equipment, Inc., South El Monte, Calif.

[21] Appl. No.: 08/975,579

[22] Filed: Nov. 21, 1997

[51] Int. Cl.⁶ .............................. A21C 3/02; A21C 11/04; A21C 15/00; A23P 1/00

[52] U.S. Cl. .............................. 99/339; 99/349; 99/353; 425/310; 425/363

[58] Field of Search ..................... 99/339–340, 349–351, 99/352–355, 386, 443 R, 443 C, 427, 400, 401; 100/151, 216, 168, 178, 172; 198/434, 448, 457; 425/308, 310, 363, 367, 141, 142, 194, 202, 229, 294, 298; 426/389, 231, 502, 503, 517

[56] References Cited

U.S. PATENT DOCUMENTS

| | | |
|---|---|---|
| 4,003,688 | 1/1977 | Mueller-Lobeck . |
| 4,312,892 | 1/1982 | Rubio . |
| 4,405,298 | 9/1983 | Blain ........................................ 425/308 |
| 4,620,826 | 11/1986 | Rubio et al. . |
| 4,917,230 | 4/1990 | Barchman ................................ 198/434 |
| 4,938,126 | 7/1990 | Rubio et al. ............................... 99/349 |
| 5,006,358 | 4/1991 | Rubio et al. . |
| 5,180,593 | 1/1993 | Mistretta et al. .................... 425/310 X |
| 5,470,599 | 11/1995 | Ruhe ................................... 426/502 X |
| 5,498,148 | 3/1996 | Quellette et al. ....................... 425/294 |
| 5,501,140 | 3/1996 | Balleza et al. . |
| 5,580,583 | 12/1996 | Caridis et al. ...................... 425/363 X |
| 5,592,870 | 1/1997 | Sanchez et al. . |
| 5,626,898 | 5/1997 | Caridis et al. . |
| 5,635,235 | 6/1997 | Sanchez et al. ...................... 99/353 X |
| 5,673,609 | 10/1997 | Sanchez et al. ...................... 99/443 C |
| 5,674,543 | 10/1997 | Partida ................................ 100/168 X |
| 5,720,990 | 2/1998 | Lawrence et al. ........................ 99/339 |
| 5,763,861 | 6/1998 | Herrera et al. ...................... 198/431 X |
| 5,811,137 | 9/1998 | Clark et al. ........................ 100/172 X |

*Primary Examiner*—Timothy F. Simone
*Attorney, Agent, or Firm*—Lyon & Lyon LLP

[57] ABSTRACT

A system for making tortillas includes a sheeter, a roller/heater, and an oven. Tortillas are die cut into an oblong shape in the sheeter. The roller/heater rolls the tortillas into a round shape and conductively heats the tortillas simultaneously on the top and bottom surfaces, gelatinizing the food product and sealing in moisture. The tortillas are then baked in an oven. Slot marks on the tortillas are avoided as the roller/heater has upper and lower belts have continuous surfaces.

4 Claims, 3 Drawing Sheets

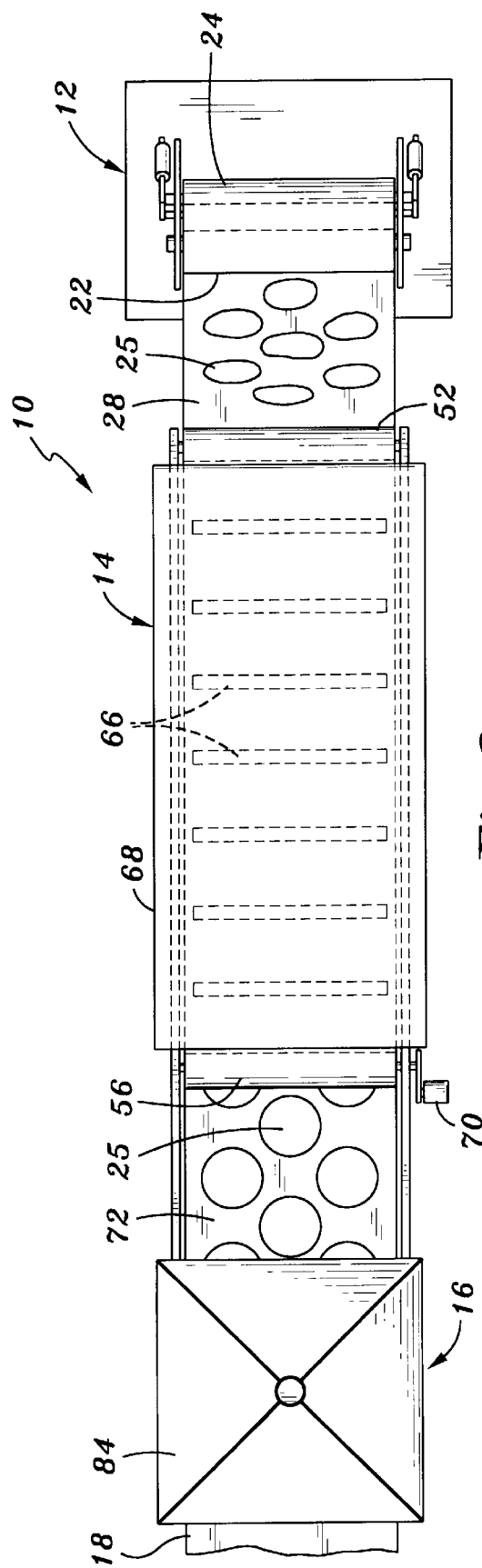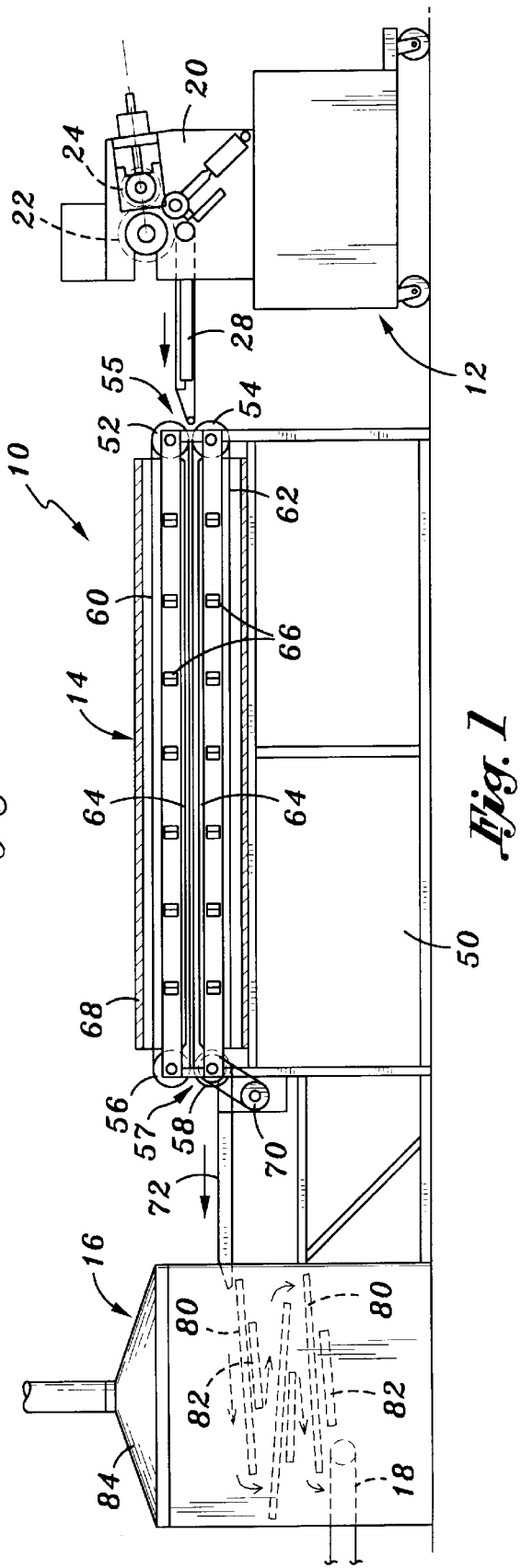

TORTILLA MANUFACTURING APPARATUS

BACKGROUND OF THE INVENTION

The field of the invention is apparatus and methods for manufacturing corn tortillas.

Traditionally, tortillas have been made by hand. For commercial scale production of tortillas necessary to meet the consumer demand for tortillas, both in stores and restaurants, making tortillas by hand is not practical, and automated production techniques are necessary.

In the past, corn tortillas have been die cut from a rolled sheet of corn or maize. The die cut tortilla is typically heated first on the bottom, with the top surface exposed to hot air or radiant heat, in an oven. Generally, the oven conveyor belts used to move tortillas through the oven are made of parallel slats pivotably attached to each other, with a small clearance gap between the slats.

While these techniques have met with varying degrees of success in the past, certain disadvantages remain. Because of the way the tortillas are heated, the final product has a less than optimal moisture content and texture. Close inspection of the tortilla's surface reveals a porous texture that dries and cracks if left exposed to the air and becomes saturated and leaks if rolled with liquid fillings. In addition, the gaps in the conveyor belts leave lines on the tortillas, creating a less than desirable appearance, at least to some consumers. Accordingly, there remains a need for improved methods and apparatus for making corn tortillas.

SUMMARY OF THE INVENTION

To these ends, a system for making corn tortillas includes a sheeter, a roller/heater, a vacuum discharge, and an oven. Preferably, the roller/heater has upper and lower belts spaced apart sufficiently to accommodate a tortilla. Advantageously, a first pair of rollers at the entrance to the roller/heater roll or press a die cut oblong tortilla into a round shape. As the tortillas move through the roller/heater, they are heated simultaneously on the top and bottom. In the preferred embodiment, this conductive heating seals the skin of the tortilla and gelatinizes the maize, sealing in moisture. The resulting tortillas have a higher moisture content, improved taste and texture, and no gap lines, as the belts are continuous. In addition, pressing the corn tends to remove any imperfections from the die cut process.

Other and further objects and advantages will appear hereinafter.

BRIEF DESCRIPTION OF THE DRAWINGS

In the drawings, wherein similar reference characters denote similar elements throughout the several views:

FIG. 1 is a side elevation view of the present system for making corn tortillas;

FIG. 2 is a plan view thereof;

DETAILED DESCRIPTION OF THE PREFERRED EMBODIMENT

Figure 3:
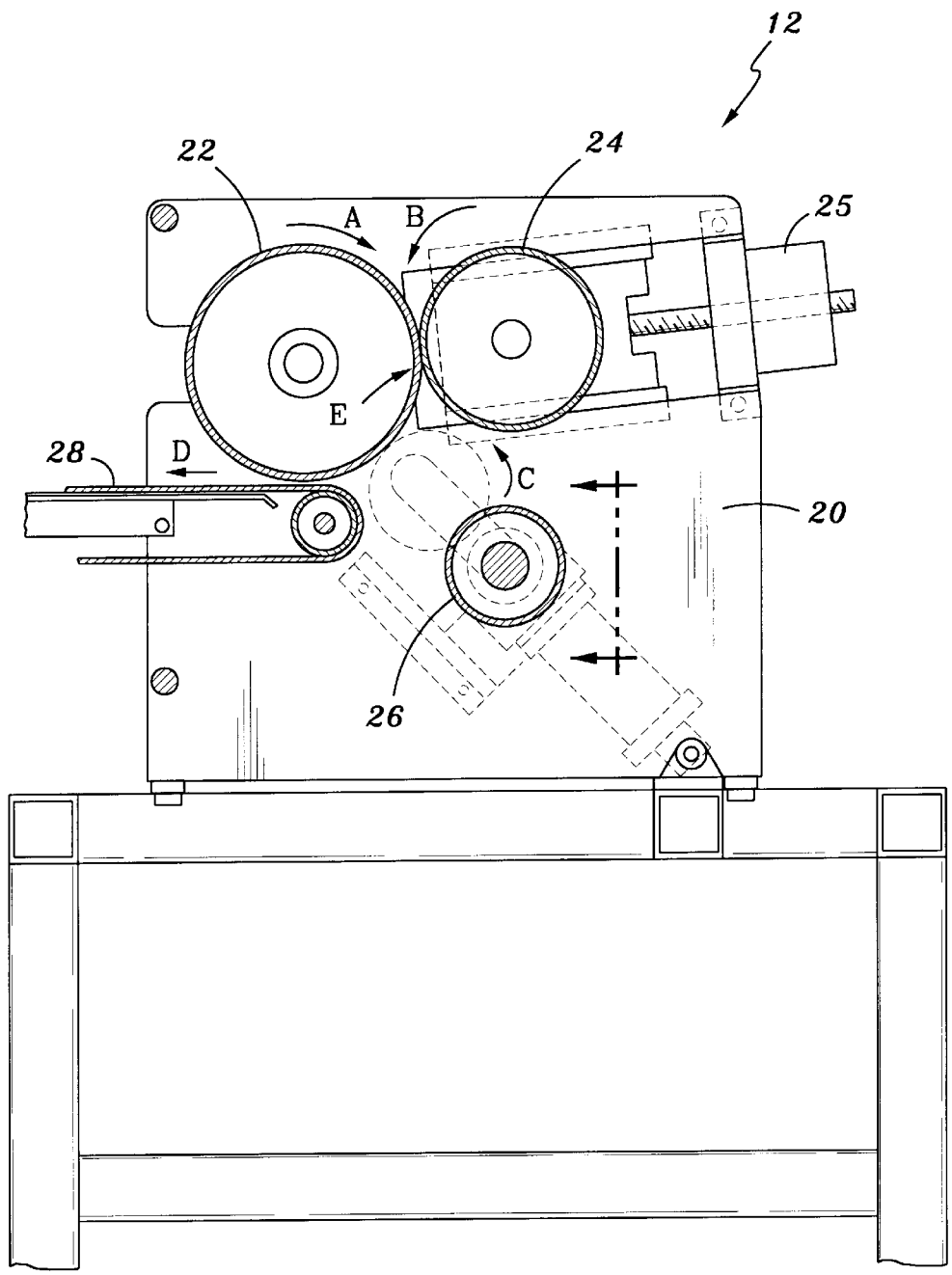
FIG. 3 is an enlarged side elevation view of the sheeter shown in FIG. 1.

Turning now in detail to the drawings, as shown in FIGS. 1 and 2, a corn tortilla system 10 includes a sheeter 12, a roller/heater 14, and an oven 16 as principal components. A packaging conveyor 18 extends from the oven 16 to a packaging area or apparatus (not shown).

Referring to FIG. 3, the sheeter 12 includes a sheeter frame 20, rotatably supporting a front roller 22, a back roller 24, and a die roller 26. A sheeter conveyor 28 extends from under the front roller 22, to the roller/heater 14.

Figure 4:
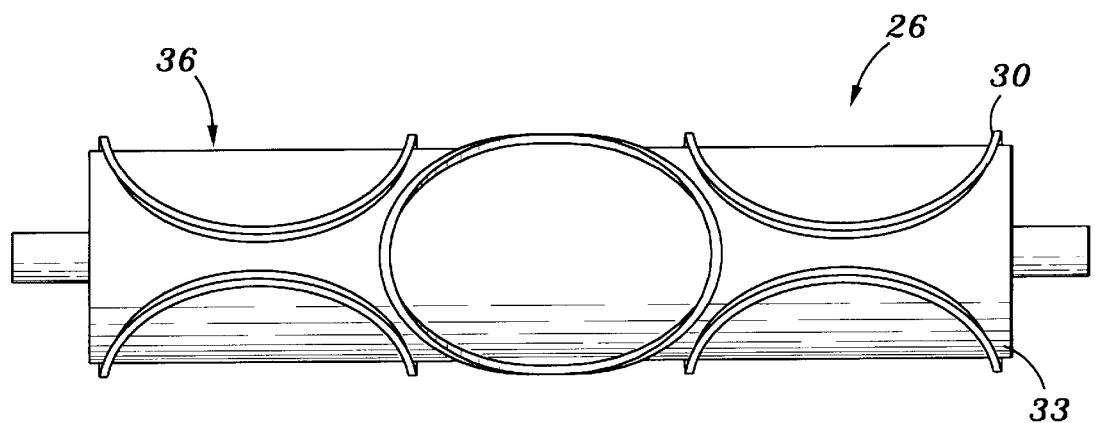
FIG. 4 is a front perspective view of the die roller shown in FIG. 3.
Figure 5:
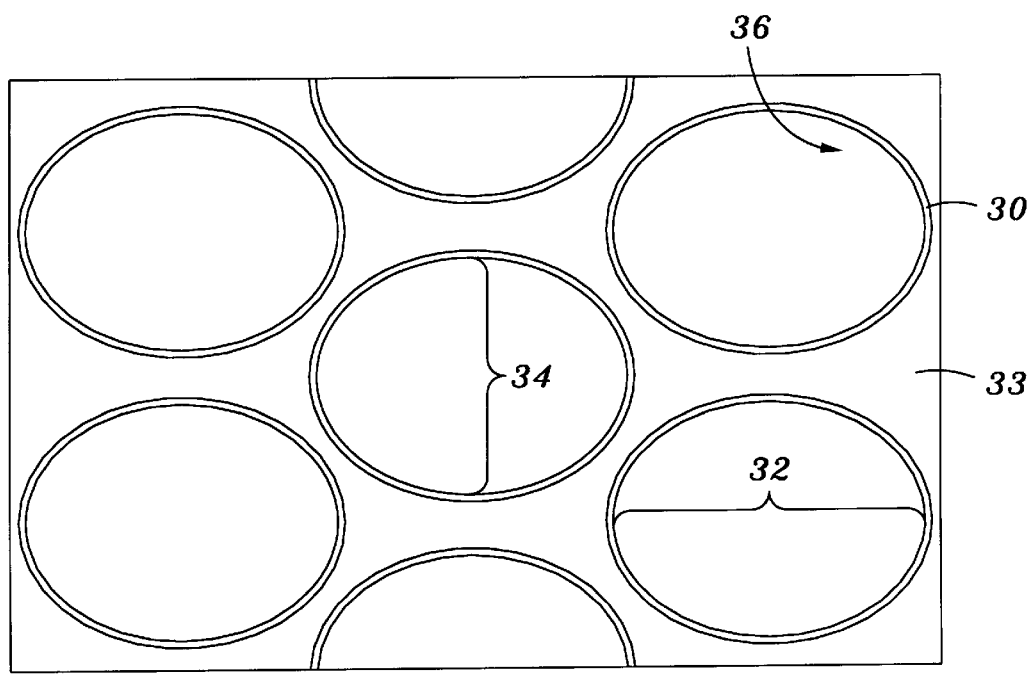
FIG. 5 is a pattern view showing the cutting surfaces of the die roller shown in FIG. 4.

Referring to FIGS. 4 and 5, the die roller 26 includes oval or ellipse-shaped cutters 30. The cutters 30 extend above the cylindrical surface 33 of the die roller 26, and form oval or ellipse-shaped tortilla recesses 36, having a major access 32, and a minor access 34. The cutters 30 are spaced closely together, to maximize the area cut out by the cutters 30.

Referring once again to FIG. 1, the roller/heater 14 includes a housing 50. An upper pinch roller 52 and a lower pinch roller 54 are rotatably attached to the housing 50, at the entrance 55 to the roller/heater. At the back or exit end 57 of the roller/heater 14, an upper end roller 56 and a lower end roller 58 are similarly rotatably mounted to the housing 50.

An upper belt 60 extends around and is supported on the upper rollers 52 and 56, while a lower belt 62 is similarly supported on and around the lower rollers 54 and 58. A plurality of belt plates 64 are supported within the housing 50 against the back surfaces of the upper belt 60 and lower belt 62. The back surfaces of the belts slide along the belt plates 64. The belt plates 64 maintain the belts in a horizontal position, and also maintain the spacing between the belts. The lower roller 58 may be provided with a vacuum system to assist in transfer of tortillas from the roller/heater to the oven.

A plurality of heaters 66 are attached to the belt plates 64. The heaters are advantageously electric element heaters. The belt plates 64 are made of thermally conductive materials, such as aluminum, to better conduct heat from the heaters 66 to the belts 60 and 62. An enclosure 68 is provided around the belts and heaters, to reduce heat loss to the environment. A motor 70 is linked to the rollers 56 and 58, to drive the belts in the direction of the arrows shown in FIG. 1. A transfer conveyor 72 extends from roller 58 to the oven 16.

The oven 16 may be of any one of several conventional designs. FIG. 1 shows a vibratory oven having inclined chutes 80 positioned over heaters 82, which may be electric or flame heaters. A vent hood 84 exhaust oven gases from the oven.

In use, corn or other food product is provided to the sheeter 12 via a hopper (not shown) using well-known techniques. The rollers 22 and 24 in the sheeter 12 turn in the direction of the arrows A and B, as shown in FIG. 3. Corn fed into the space between the rollers is flattened into a sheet. The corn sheet is substantially the same width as the rollers 22 and 24, and has a thickness suitable for making tortillas. The spacing between the rollers 22 and 24 can be adjusted with an adjustor/positioner 25 as is well-known. The corn sheet separates or is stripped away from the rear roller 24 and continues to move on the surface of the front roller 22. The die roller 26 is engaged against the front roller 22. The cutters 30 on the die roller 26 cut out oval or ellipse-shaped tortillas which are deposited onto the sheeter conveyor 28. The remaining uncut areas of the corn sheet are returned to the hopper.

The oblong tortillas 25 are carried on the sheeter conveyor 28 in the direction of the arrow D to the roller/heater 14. At the entrance 55 of the roller/heater 14, the oblong tortillas are rolled between the rollers 52 and 54. This flattens the tortillas and makes them substantially round. The tortillas move in between the upper belt 60 and lower belt 62 into the roller/heater 14, wherein they are simultaneously heated on top and bottom. The heaters 66 generate heat which conducts into the belt plates 64, through the belts 60 and 62, and to the tortillas. The belt plates 64 back up the belts and maintain the belts in contact with the top and bottom surfaces of the tortillas. The tortillas consequently are conductively heated on the top and bottom surfaces.

The tortillas continue to move through the roller/heater 14 and emerge at the back end, passing between the end rollers 56 and 58 and onto the transfer conveyor 72. The transfer conveyor 72 carries the now round and parbaked tortillas to the oven 16. In the oven 16, the tortillas are baked and handled using conventional techniques.

With the above-described system, moisture within the tortilla is sealed in, as the top and bottom surfaces of the tortilla are simultaneously conductively heated. This conductive heating seals the skin or outer surface of the tortilla, by gelatinizing the outer surfaces. Because the belt 60 and 62 have continuous surfaces, the tortillas are produced without gap marks.

The oven 16 is preferably a vibratory oven. Although vibratory ovens have been used in the past, they have not generally performed well, because with conventional tortilla production, too much water remains on the surface of the tortilla, causing the tortillas to bunch up. The sheeting and heating of the tortillas in the roller/heater 14 results in tortillas which do not bunch up as much as with prior techniques, thereby allowing use of a vibratory oven.

The oven chutes 80 have smooth semi-cylindrical surfaces. Vibrators 83 attached to the chutes 80 cause a chute to vibrate. Tortillas on the chutes 80 slide downhill on the chutes 80, while they are heated via conduction and convection. At the end of each chute, the tortillas flip over, so that the tortillas are evenly cooked on both sides. When the tortillas move off of the last oven chute 80 onto the packaging conveyor 18, they are fully baked and ready for packaging.

Thus, while a single embodiment has been shown and described, it will be apparent that many modifications and substitutions of equivalents may be made, without departing from the spirit and scope of the invention. The invention, therefore, should not be limited, except by the following claims.

What is claimed is:

1. A system for making tortillas comprising:

a sheeter;

a roller/heater having an enclosure, an upper belt around a first pair of rollers, and a lower belt around a second pair of rollers, the upper belt and the lower spaced apart sufficiently to accommodate a tortilla therebetween, the roller/heater also having a heater within the enclosure;

a first conveyor extending from the sheeter to the roller/heater;

an oven; and a second conveyor extending from the roller/heater to the oven.

2. The system of claim 1 wherein the oven is a vibratory oven.

3. The system of claim 1 wherein the sheeter comprises a die roller having elliptical cutting surfaces.

4. The system of claim 1 wherein the roller/heater includes an upper belt plate and a lower belt plate, with the upper belt slidably positioned under the upper belt plate, and with the lower plate slidably positioned over the lower belt plate.

* * * * *